(12) United States Patent
Statchuk

(10) Patent No.: US 9,798,864 B2
(45) Date of Patent: Oct. 24, 2017

(54) EMBEDDED INTEGRATED COMPONENT GOVERNANCE POLICY

(71) Applicant: International Business Machines Corporation, Armonk, NY (US)

(72) Inventor: Craig A. Statchuk, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/640,830

(22) Filed: Mar. 6, 2015

(65) Prior Publication Data
US 2016/0259948 A1 Sep. 8, 2016

(51) Int. Cl.
G06F 21/62 (2013.01)
G06F 21/10 (2013.01)

(52) U.S. Cl.
CPC ........ G06F 21/105 (2013.01); G06F 21/6218 (2013.01)

(58) Field of Classification Search
CPC .... G06F 21/6218; G06F 21/105; G06F 21/12; G06F 21/121
See application file for complete search history.

(56) References Cited

U.S. PATENT DOCUMENTS

| | | | |
|---|---|---|---|
| 8,327,318 B2 | 12/2012 | Chaar et al. | |
| 8,707,385 B2 | 4/2014 | Jain et al. | |
| 8,751,620 B2 | 6/2014 | Anderson et al. | |
| 2006/0106821 A1* | 5/2006 | Cox | G06F 21/105 |
| 2006/0195819 A1* | 8/2006 | Chory | G06F 17/3089 717/117 |
| 2009/0241104 A1* | 9/2009 | Amiga | G06F 8/65 717/174 |
| 2012/0331340 A1* | 12/2012 | Birkler | G06F 11/0703 714/15 |
| 2013/0067598 A1* | 3/2013 | Da Palma | G06F 21/121 726/29 |
| 2013/0219361 A1 | 8/2013 | Fiebig et al. | |
| 2013/0254744 A1* | 9/2013 | Sahoo | G06F 8/73 717/123 |
| 2014/0026131 A1 | 1/2014 | Ravi | |
| 2014/0282849 A1 | 9/2014 | Collison et al. | |
| 2015/0378700 A1* | 12/2015 | Rachamadugu | G06F 8/70 717/120 |

* cited by examiner

*Primary Examiner* — Kambiz Zand
*Assistant Examiner* — Mary Li
(74) *Attorney, Agent, or Firm* — Reza Sarbakhsh

(57) ABSTRACT

A computer program product, a method, and an information handling system is provided to track and retrieve licensing agreements of features integrated into an application by detecting during development of an application installation of one or more features having a licensing agreement associated with using the one or more features; storing in a database a mapping between the one more installed features to a corresponding licensing agreement for each of the one or more installed features; and providing support to retrieve for the each installed features, the corresponding licensing agreement.

18 Claims, 5 Drawing Sheets

EMBEDDED INTEGRATED COMPONENT GOVERNANCE POLICY

BACKGROUND

1. Field

The invention relates to a computing environment. More particularly to a computer program, method, and system for ensuring compliance with integrated components.

2. General Background

Instrumental to efficiently developing applications is integrating previously developed components and services constructed from existing components and services. Different components may have different terms and conditions that govern their usage. A typical commercial product has, for example, an End User License Agreement (EULA) to which each user must agree. The EULA may be for example, a click wrap, shrink wrap, an OS license, and the like.

During development of an application a developer may include one or more previously developed components with different EULAs. The developer agrees to the EULA and installs the component. During this integration, the component becomes part of a larger executable. During deployment of the larger executable, there is a need to ensure that terms for each component are enforced for each user executing the application.

SUMMARY

According to one embodiment of the invention, there is provided a computer program product stored in a computer readable medium for tracking and retrieving licensing agreements of features integrated into an application. The computer program product comprises computer instructions that, when executed by an information handling system, causes the information handling system to perform operations including detecting during development of an application installation of one or more features having a licensing agreement associated with using the one or more features; storing in a database a mapping between the one more installed features to a corresponding licensing agreement for each of the one or more installed features; and providing support to retrieve for the each installed features, the corresponding licensing agreement.

According to another embodiment of the invention, there is provided a method for tracking and retrieving licensing agreements of features integrated into an application, the method implemented by a processor performing steps of detecting during development of an application installation of one or more features having a licensing agreement associated with using the one or more features; storing in a database a mapping between the one more installed features to a corresponding licensing agreement for each of the one or more installed features; and providing support to retrieve for the each installed features, the corresponding licensing agreement.

According to another embodiment of the invention, there is provided an information handling system. The information handling system comprises a plurality of processors, a memory coupled to at least one of the processors, a set of instructions stored in the memory and executed by at least one of the processors. The information handling system performs the actions of detecting during development of an application installation of one or more features having a licensing agreement associated with using the one or more features; storing in a database a mapping between the one more installed features to a corresponding licensing agreement for each of the one or more installed features; and providing support to retrieve for the each installed features, the corresponding licensing agreement.

BRIEF DESCRIPTION OF THE DRAWINGS

The above-mentioned features of the present invention may be better understood, and its numerous objects, features, and advantages made apparent to those skilled in the art by taken in conjunction with the accompanying drawings wherein like reference numerals denote like elements and in which.

DETAILED DESCRIPTION

Figure 1:
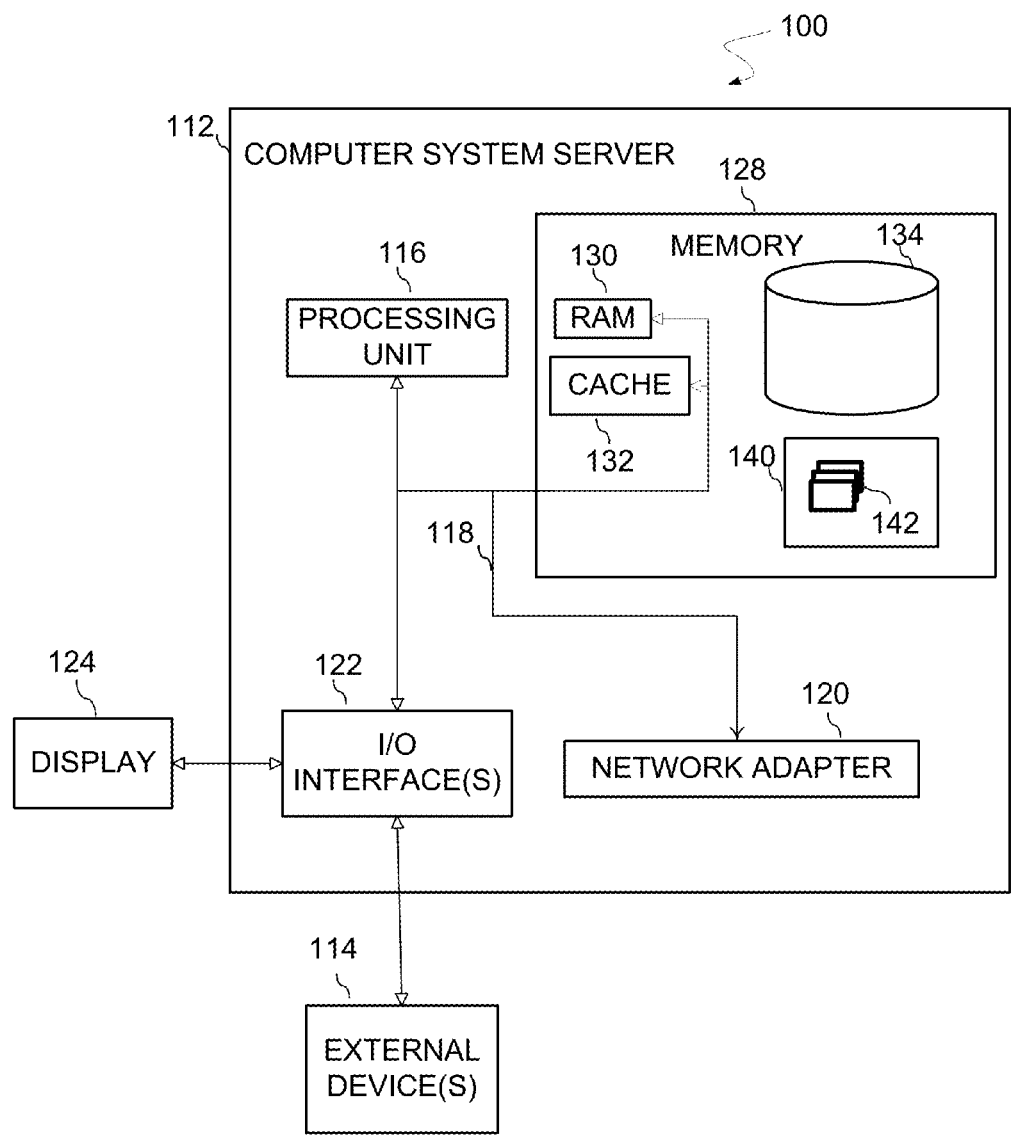
FIG. 1 depicts a cloud computing node according to an embodiment of the present invention and is a block diagram example of a data processing system in which the methods described herein can be implemented.

Embodiments of the invention are described below with reference to drawings in detail.

When components are integrated into an application, a developer typically installs each component in a development system and agrees to the terms and conditions of the component being installed. In addition, components may be installed in production and other deployment environments. The embedded component may be an executable implemented to perform a tasks, such as, but not limited to a service, a feature, or a function. The constructed application may have many embedded different components. Different embedded components could have different origins, for example, open source, purchased, provided under a contract, and etc. Each of the embedded components may have separate, distinct, and different terms and conditions. For the purposes of this disclosure, the terms and conditions for using each embedded component is hereafter referred to as governance policy. There are various examples of governance policy. Examples include EULA, specific hardware environment, a specific software environment, a purchase of a license, or any other type of restriction for usage. For the purposes of this disclosure, the terms and conditions for an embedded component to which the user is to agree is called a "contract." Later when an end user uses the application, the governance policy conditions have already been agreed to by the developer and the embedded governance policy conditions may be lost. Currently, embedded component governance policy is not tracked by application during the integration of the component into an application being developed. Keeping track during integration would facilitate ensuring proper overall product terms and conditions. The overall product terms and conditions are distinct from the component governance policy for the purposes of this disclosure. Currently the governance policy of embedded components are not tracked separately by user. In addition, the same component may be in multiple different applications or services. Once a verification of governance policy by a user for an embedded component in a system has been confirmed in one application, there should be no requirement to prompt the same user to agree to the same contract for the same component in a second application. Without a tracking by user for embedded components, each usage would entail an additional agreement from the same user.

In view of the deficiencies in prior art, various method, system, and computer program product embodiments of the invention are provided herein.

Cloud computing provides a means to use computing resources that are remote from a client machine being directly accessed by a user. There are various applications and services available as cloud applications. Many businesses already use cloud computing and cloud databases. These businesses are developing and providing end user applications. As individuals purchase their 'Virtual PCs' with virtual desktops, customized applications, etc., they will be utilizing virtual or cloud databases.

The cloud environment has the potential to provide many advantages to a server or specific web site support. The cloud environment typically has security, load balancing, and other desirable features where computing resources may be adjusted to meet changing needs.

An example embodiment is described ensuring integrated component governance policy are tracked when incorporated into a development environment by component and application. Subsequent to activation, the governance policy are tracked and remediated for each user at least the first time a user may use an embedded component for an application. The end user may use, for example, a single authentication to control a set of cloud data bases and utilize a supporting infrastructure providing a consistent view of the data in the set of cloud data bases for one or more applications. It is understood in advance that although the invention described herein includes a detailed description on cloud computing, implementation of the teachings may be supported on other computing environments, for example, a single machine. In addition, the recited teachings are not limited to the existing cloud computing environment. Rather, embodiments of the present invention are capable of being implemented in conjunction with any other cloud computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth herein. In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, system memory 128 may include at least one program product having a set (e.g., at least one) of program modules that are configured to carry out the functions of embodiments of the invention.

Program/utility 140, having a set (at least one) of program modules 142, may be stored in system memory 128 by way of example, and not limitation, as well as an operating system, one or more application programs, other program modules, and program data. Each of the operating systems may have one or more application programs, other program modules, and program data or some combination thereof, and may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server. Examples, include, but are not limited to: microcode, device drivers, redundant processing units, external disk drive arrays, RAID systems, tape drives, and data archival storage systems, etc.

Figure 2:
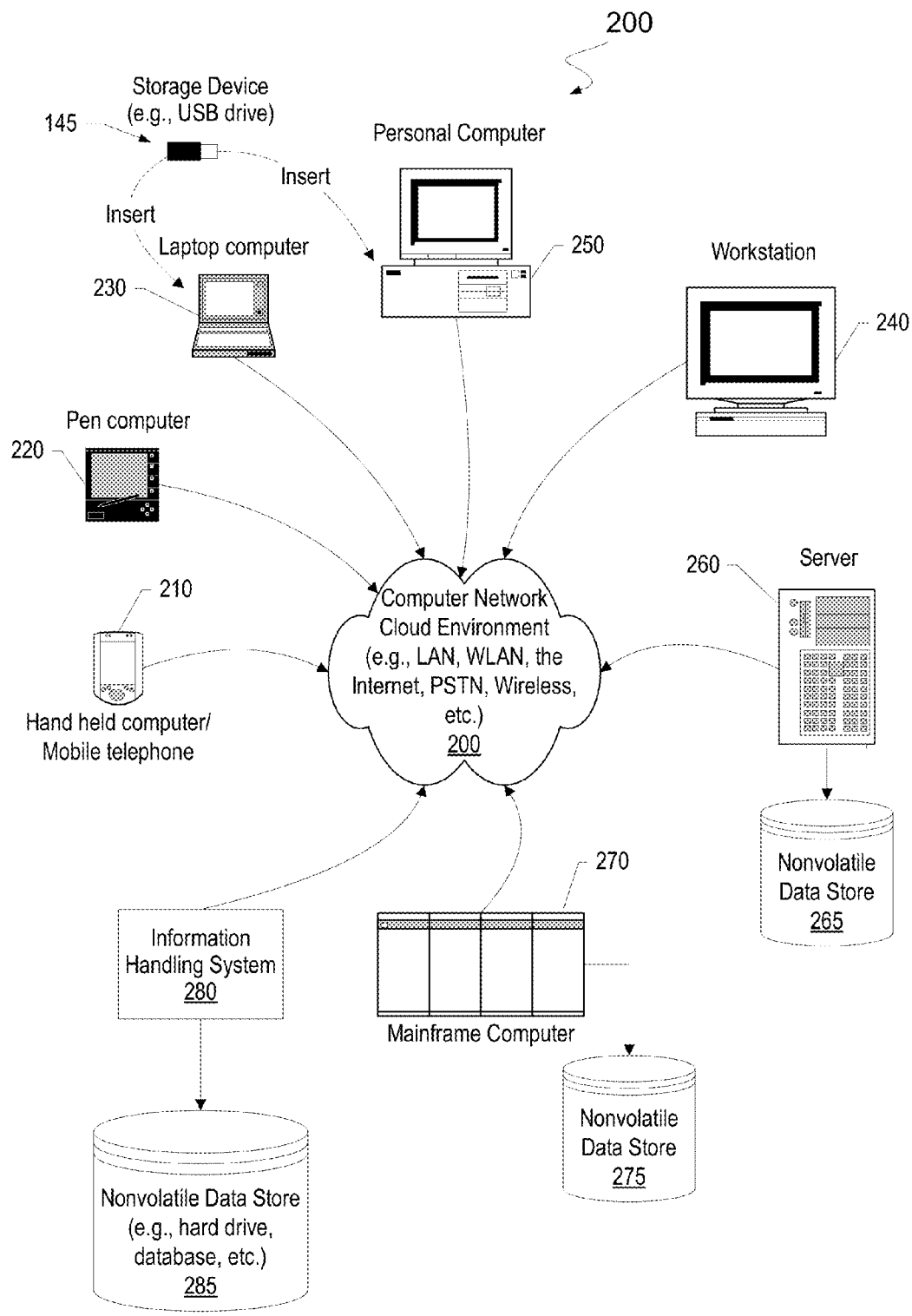
FIG. 2 provides an extension example of the information handling system environment shown in FIG. 1 and a networking cloud environment to illustrate that the methods, systems, and program products described herein can be performed on a wide variety of information handling systems which operate in a networked environment.

Referring now to FIG. 2, illustrative cloud computing environment 200 is depicted. FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As shown, cloud computing environment 200 comprises one or more cloud computing nodes with which local computing devices used by cloud consumers, such as, for example, personal digital assistant (PDA) 210 or cellular telephone 210, desktop computer 250, laptop computer 230, and/or other mobile device such as an automobile computer system may communicate. Nodes in the computer network 205 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices shown in FIG. 2 are intended to be illustrative only and that computing nodes in cloud computing environment 200 can communicate with any type of computerized device over any type of network and/or network addressable connection (e.g., using a web browser). Types of computer network that can be used to interconnect the various information handling systems include Local Area Networks (LANs), Wireless Local Area Networks (WLANs), the Internet, the Public Switched telephone Network (PSTN), and others. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260 archival storage systems 265, etc. Other types of information handling systems that are not individually shown in FIG. 2 are represented by information handling system 280. As shown, the various information handling systems can be networked together using computer network 205.

Figure 3:
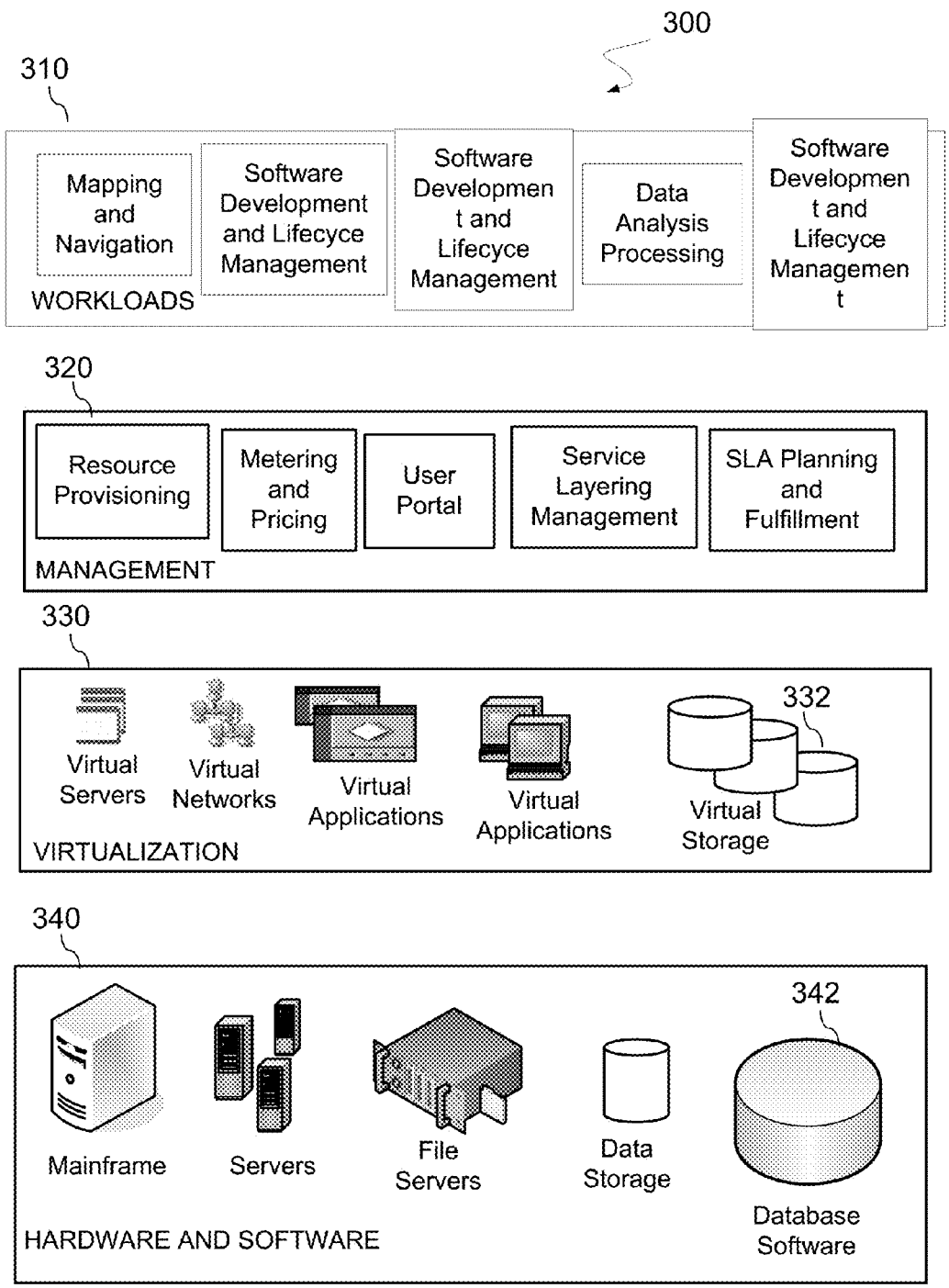
FIG. 3 depicts a cloud computing environment with abstraction model layers according to an embodiment of the present invention.

Referring now to FIG. 3, a set of functional abstraction layers 300 provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 340 includes hardware and software components. Examples of hardware components include mainframes, examples include IBM® zSeries® systems; RISC (Reduced Instruction Set Computer) architecture based servers, IBM pSeries® systems; IBM xSeries® systems; IBM BladeCenter® systems; storage devices; networks and networking components. Examples of software components include network application server software, in one example IBM WebSphere application server software; and database software, in one example IBM DB2® database software. (IBM, zSeries, pSeries, xSeries, BladeCenter, and DB2 are trademarks of International Business Machines Corporation registered in many jurisdictions worldwide).

Virtualization layer 330 provides an abstraction layer from which the following examples of virtual entities may be provided: virtual servers; virtual storage 332; virtual networks, including virtual private networks; virtual applications and operating systems; and virtual clients.

In one example, management layer 320 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management layer 320 provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 310 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
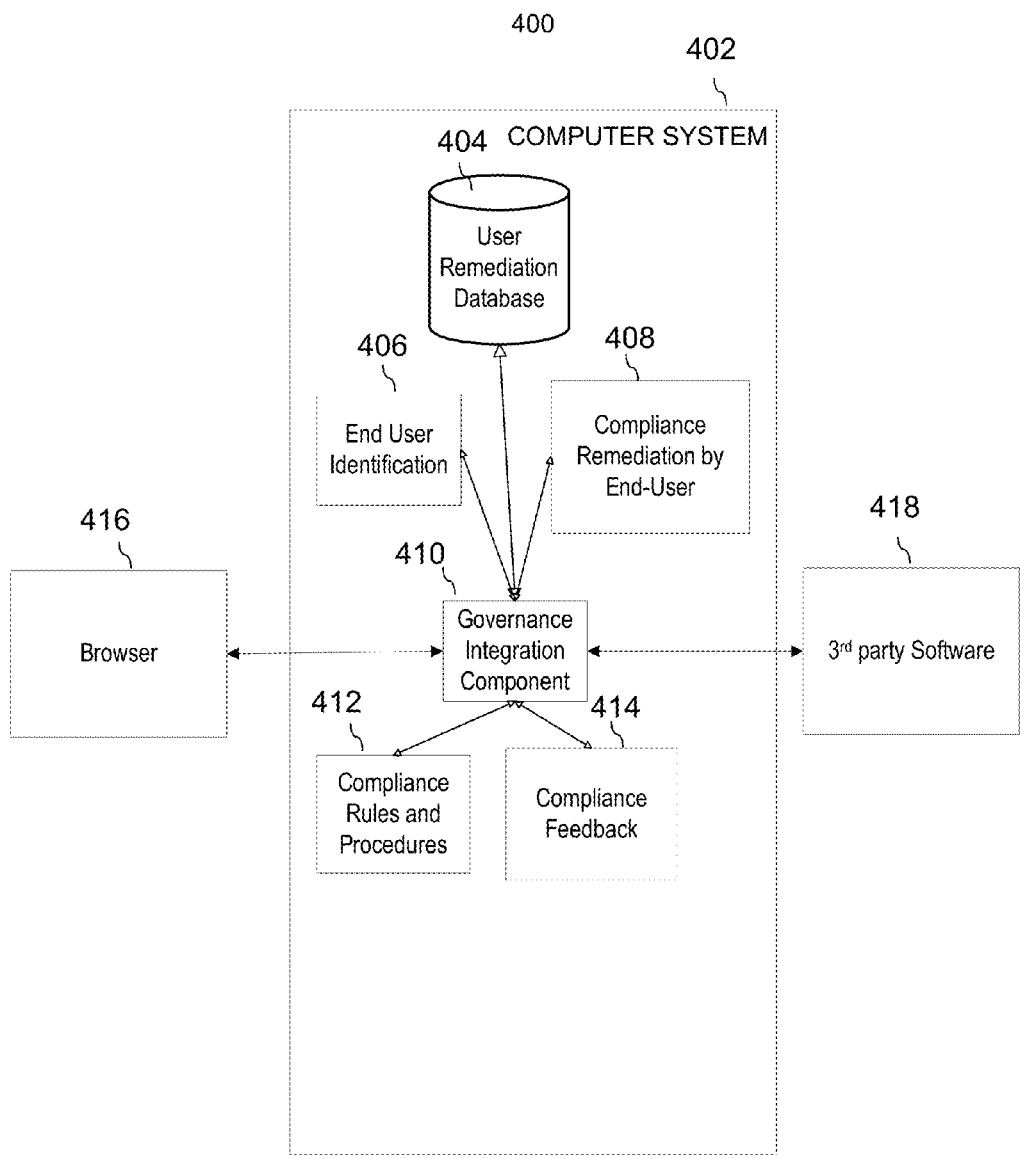
FIG. 4 depicts a functional set of components and a flow of control for tracking integration of components into one or more applications and for ensuring a governance policy by each user utilizing any of the one or more applications.

Referring now to FIG. 4, a functional set of components and a flow of control is depicted for tracking integration of components into one or more application and for ensuring a governance policy by each user utilizing any of the applications.

The System 402 may be any computing system infrastructure, for example, System Server 112 or Cloud infrastructure 200. When a user utilizes a Browser 416 to access the System 402, the Browser 416 is configured to interface with a Governance Integration Component 410. In an exemplary embodiment, the Governance Integration Component 410 may be embedded a Cloud gateway. The Governance Integration Component 410 supports identification of $3^{rd}$ party Software 418. The Governance Integration Component 410 may provide application programming interfaces (APIs) such as a Representational state transfer (REST) to support input parameters identifying the $3^{rd}$ party Software 418, custom built software components, corporate and private data, development data, a governance policy, and the like. The interface may have default values for these parameters in which case the values for these parameters may not actually be entered by an end user or commands calling the interface. Depending on embodiment details, the location of expected items may be, for example, predetermined.

In the example computing system infrastructure, the Governance Integration Component 410 also interfaces with an End User Identification 406 that authenticates the user and distinguishes the user from other users in a domain. In other embodiments, the user or application calling the interface may be authenticated by a cloud administration support. This usually involves the user supplying a user identification and password. The administration support may utilize any of the various encryption schemes to provide appropriate security. The Governance Integration Component 410 adds information into the User Remediation Database 404. The added information may include $3^{rd}$ party Software 418, a governance policy for the 3rd party Software 418, embedded component remediation information, such as, status by user, and the like. The User Remediation Database 404 may be a database management system (DBMS) supporting indexing, queries, and other typical database features. The user, accessing the system 402 utilizing Browser 418 may identify rules, policies, remediation steps, remediation procedures, user authentication rules, application restrictions, user groups, roles, and any other aspect of governance policy. The system 402 may have default information for tracking of embedded component governance policy including for example, workspaces, table spaces, roles, back up and recovery privileges, database engine resources including the areas for SQL processing, Parallel Query Option (PQO), indexes, shared pools, disk I/O, multi-threaded Servers (MTS), alerting profiles, and memory blocks including buffers, fragments, segments, and extents. Although the user interface depicted in FIG. 4 is Browser 416, any user interface may be used. The user interface may provide a GUI where the user inputs parameters as menu entries, command line entries, scripts entries, configuration files, .xml files, or any other means of providing the required information. In some embodiments, the system may derive the required information from the $3^{rd}$ party components themselves. As the system may keep track of information extracted from the $3^{rd}$ party components and determine patterns for adding additional $3^{rd}$ party components. Technologies such as artificial intelligence (AI) and machine learning (ML) may be utilized to improve the processing over time.

After embedded components are integrated into the User remediation Database 404, support for user remediation may be activated allowing for verification of governance policy by user. The activation may be initiated by a developer after an embedded component has been integrated. In the depicted infrastructure in FIG. 4, a user accessing System 402 using Browser 416 initiates an application (not shown) that requires a component governance policy. Governance Integration Component 410 receives End User Authentication 406 and queries User Remediation Database 404 to determine if embedded component compliance remediation is required. If embedded compliance remediation is required, then Compliance Remediation by End-User 408 is executed by Governance Integration Component 410. Compliance remediation may be, for example, presenting a contract to the user for one or more components by the Browser 416. Once the user agrees to the contract for a first embedded component, then Governance Integration Component 410 updates User Remediation Database 404 with the status indicating compliance for the first embedded component. If the user does not agree to a second component contract, then the second embedded component state is not updated to the compliance state. The determination of the compliance state for the second embedded component depends on Compliance Rules and Procedures 412. In addition, remediation may also depend on Compliance Feedback 414. Once compliance for the first embedded component for the user occurs, subsequent attempts to use the first embedded component by the first user are allowed and the first embedded component remediation action is disabled or inhibited. There may be, for example, rules related to security and encryption. In an embodiment, a storage system is utilized that unifies the key storage functions for both assignment and protection of data. The infrastructure supports the virtualization of the storage system allowing data mobility within a shared resource pool. However, if the user is attempting to access unencrypted data using non-secure channel where the compliance rules require a secure channel, the access to the second embedded component may be not allowed, disabled, or denied. The governance policy could, for example, include rules allowing for execution of the first embedded component by the user and inhibiting, not allowing, or disabling execution of the second embedded component.

Figure 5:
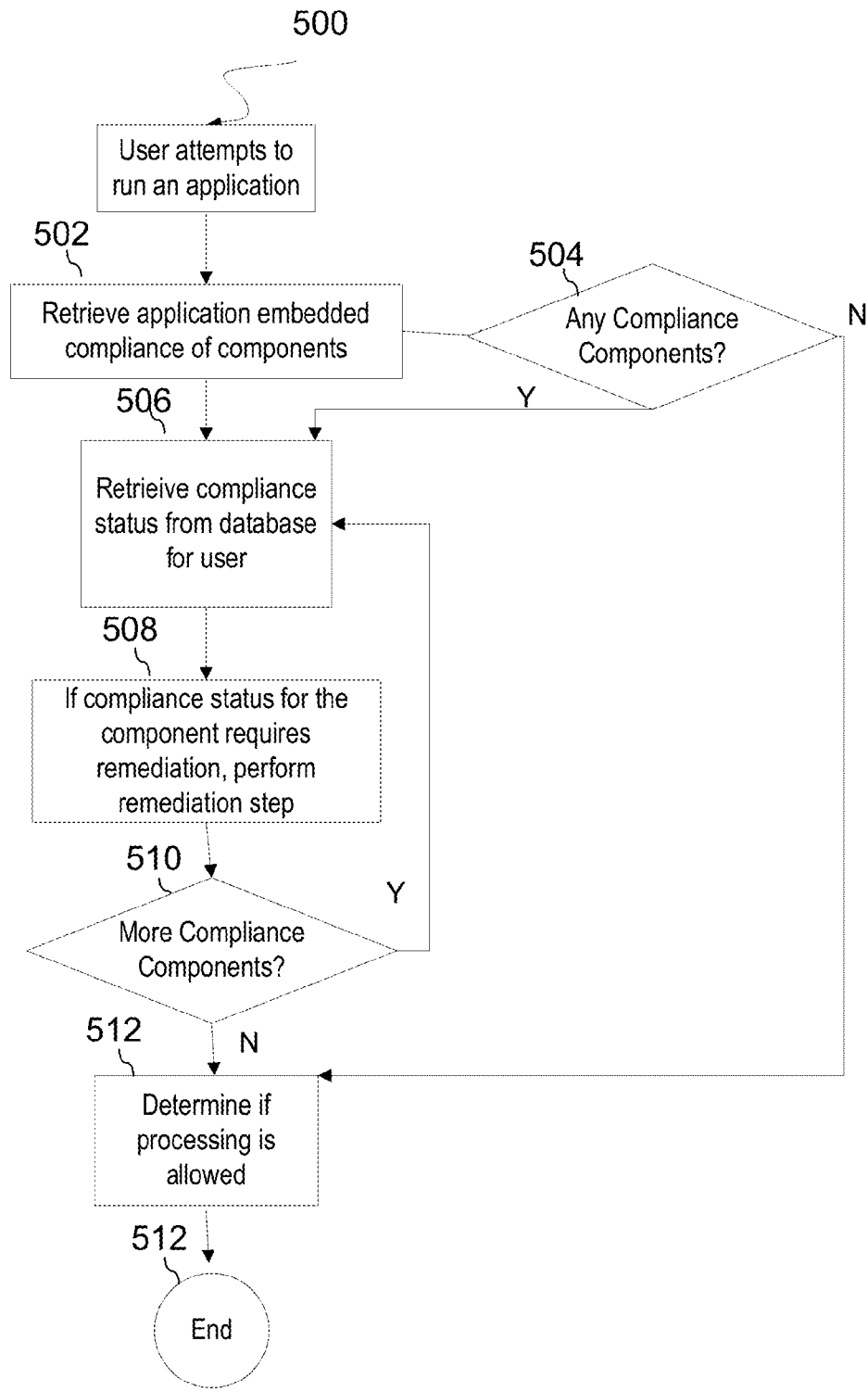
FIG. 5 depicts a flow of component governance policy by user based on component usage.

FIG. 5 depicts an example embodiment depicting an example flow of component governance policy by user based on embedded component usage in an example embodiment. The process begins at step 500 where a user has selected an application for execution in System 402 utilizing Browser 416. The Browser 416 interfaces with the Governance Integration Component 410 which receives End User Identification 406. The process continues to step 502 where the Governance Integration Component 410 formulates a query and requests component information from User Remediation Database 404. The query includes information about the application being accessed by the user from the Browser 416 as well as End User Identification 406. The User Remediation Database 404 returns embedded compliance components used by the application to the Governance Integration Component 410. The process continues to step 504 where a determination is made as to if there are any embedded compliance components for the application. If there are no embedded compliance components, the process continues at step 512. If there are embedded compliance components, the process continues at step 506 where the Governance Integration Component 410 formulates a query and requests End User compliance component status for an embedded compliance component to the User Remediation Database 404. The User remediation Database 404 returns a component status for the embedded compliance component for the user to the Governance Integration Component 410 in step 506. The process proceeds to step 508 where a remediation step is performed, if required. The process continues to step 510 where a determination is made as to if there are additional compliance components to process. If there are additional compliance components to handle, control loops back to step 506. If there are no additional compliance components to handle, processing continues to step 512. At step 512, the Governance Integration Component 410 makes a determination if processing is allowed. If there are no embedded compliance components requiring remediation, processing is allowed. If there is any embedded compliance component requiring remediation, a predetermined policy is followed to make the determination. The predetermined policy is defined by the Governance Policy detailed as Compliance Rules and Procedures 410 and Compliance Feedback 414.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for tracking and retrieving licensing agreements of features integrated into an application comprising a computer readable storage medium having a plurality of instructions stored thereon, which, when executed by a processor, cause the processor to perform operations including:
   detecting one or more embedded application components of an application during development of an application installation;
   determining one or more terms and conditions associated with the one or more embedded application components;
   in response to determining the one or more terms and conditions, authenticating a user associated with the application installation based on user identification data;
   querying a user remediation database to retrieve compliance data associated with the authenticated user and the detected one or more embedded application components, wherein the user remediation database comprises information associated with the detected one or more embedded application components and compliance data associated with a plurality of authenticated users, and wherein the compliance data comprises a compliance status and one or more compliance rules for each of the plurality of authenticated users based on compliance or non-compliance with the one or more terms and conditions associated with the detected one more embedded application components;

based on the retrieved compliance data associated with the authenticated user, determining compliance or non-compliance with the one or more terms and conditions associated with the detected one or more embedded application components for the application installation;

storing in the user remediation database an updated mapping between the authenticated user and the one or more terms and conditions associated with the detected one or more embedded application components based on the determined compliance or non-compliance; and providing support to retrieve the updated mapping for each of the plurality of authenticated users.

2. The computer program product of claim 1, wherein the application is targeted for deployment in a cloud environment.

3. The computer program product of claim 2, wherein a first licensing agreement for a first embedded application component is detected by a governance integration component responsive to a developer agreeing to the one or more terms and conditions for installing the first embedded application component.

4. The computer program product of claim 3, wherein a second licensing agreement for a second embedded application component is detected by the governance integration component responsive to a developer installing an open source software with an open source licensing agreement and the second licensing agreement is the open source licensing agreement.

5. The computer program product of claim 4, wherein a third licensing agreement for a third embedded application component is detected by the governance integration component responsive to a developer installing a purchased product and the third licensing agreement are the one or more terms and conditions for using the purchased product.

6. The computer program product of claim 5, wherein a fourth licensing agreement for a fourth embedded application component is detected by the governance integration component responsive to a developer installing a product provided under a contract and the fourth licensing agreement contains provision specified in the contract.

7. A method for tracking and retrieving licensing agreements of features integrated into an application, the method implemented by a processor, comprising:

detecting one or more embedded application components of an application during development of an application installation;

determining one or more terms and conditions associated with the one or more embedded application components;

in response to determining the one or more terms and conditions, authenticating a user associated with the application installation based on user identification data;

querying a user remediation database to retrieve compliance data associated with the authenticated user and the detected one or more embedded application components, wherein the user remediation database comprises information associated with the detected one or more embedded application components and compliance data associated with a plurality of authenticated users, and wherein the compliance data comprises a compliance status and one or more compliance rules for each of the plurality of authenticated users based on compliance or non-compliance with the one or more terms and conditions associated with the detected one more embedded application components;

based on the retrieved compliance data associated with the authenticated user, determining compliance or non-compliance with the one or more terms and conditions associated with the detected one or more embedded application components for the application installation;

storing in the user remediation database an updated mapping between the authenticated user and the one or more terms and conditions associated with the detected one or more embedded application components based on the determined compliance or non-compliance; and providing support to retrieve the updated mapping for each of the plurality of authenticated users.

8. The method of claim 7, wherein the application is targeted for deployment in a cloud environment.

9. The method of claim 8, wherein a first licensing agreement for a first embedded application component is detected by a governance integration component responsive to a developer agreeing to the one or more terms and conditions for installing the first embedded application component.

10. The method of claim 9, wherein a second licensing agreement for a second embedded application component is detected by the governance integration component responsive to a developer installing an open source software with an open source licensing agreement and the second licensing agreement is the open source licensing agreement.

11. The method of claim 10, wherein a third licensing agreement for a third embedded application component is detected by the governance integration component responsive to a developer installing a purchased product and the third licensing agreement are the one or more terms and conditions for using the purchased product.

12. The method of claim 11, wherein a fourth licensing agreement for a fourth embedded application component is detected by the governance integration component responsive to a developer installing a product provided under a contract and the fourth licensing agreement contains provision specified in the contract.

13. An information handling system comprising:

at least one processor;

a memory coupled to the at least one processor;

a set of instructions stored in the memory and executed by the at least one processor for tracking and retrieving licensing agreements of features integrated into an application wherein the set of instructions perform operations including:

detecting one or more embedded application components of an application during development of an application installation;

determining one or more terms and conditions associated with the one or more embedded application components;

in response to determining the one or more terms and conditions, authenticating a user associated with the application installation based on user identification data;

querying a user remediation database to retrieve compliance data associated with the authenticated user and the detected one or more embedded application components, wherein the user remediation database comprises information associated with the detected one or more embedded application components and compliance data associated with a plurality of authenticated users, and wherein the compliance data comprises a compliance status and one or more compliance rules for each of the plurality of authenticated users based on compliance or non-compliance with the one or more terms and conditions associated with the detected one more embedded application components;

based on the retrieved compliance data associated with the authenticated user, determining compliance or non-compliance with the one or more terms and conditions associated with the detected one or more embedded application components for the application installation;

storing in the user remediation database an updated mapping between the authenticated user and the one or more terms and conditions associated with the detected one or more embedded application components based on the determined compliance or non-compliance; and providing support to retrieve the updated mapping for each of the plurality of authenticated users.

14. The information handling system of claim 13, wherein the application is targeted for deployment in a cloud environment.

15. The information handling system of claim 14, wherein a first licensing agreement for a first embedded application component is detected by a governance integration component responsive to a developer agreeing to the one or more terms and conditions for installing the first embedded application component.

16. The information handling system of claim 15, wherein a second licensing agreement for a second embedded application component is detected by the governance integration component responsive to a developer installing an open source software with an open source licensing agreement and the second licensing agreement is the open source licensing agreement.

17. The information handling system of claim 16, wherein a third licensing agreement for a third embedded application component is detected by the governance integration component responsive to a developer installing a purchased product and the third licensing agreement are the one or more terms and conditions for using the purchased product.

18. The information handling system of claim 17, wherein a fourth licensing agreement for a fourth embedded application component is detected by the governance integration component responsive to a developer installing a product provided under a contract and the fourth licensing agreement contains provision specified in the contract.

* * * * *